July 4, 1967     E. V. GRUMMAN     3,329,402

JACK BASE FOR TRAILERS

Filed July 12, 1965

INVENTOR.
EUGENE V. GRUMMAN
BY
ATTORNEY.

United States Patent Office 3,329,402
Patented July 4, 1967

3,329,402
JACK BASE FOR TRAILERS
Eugene V. Grumman, 1337 Barr St.,
Fairfield, Conn. 06430
Filed July 12, 1965, Ser. No. 471,063
4 Claims. (Cl. 254—86)

This invention relates to jack stands for supporting house trailers and/or travel trailers and the like after they have been disconnected from a towing vehicle.

House trailers normally include tongue means at their forward end that is adapted to be hitched to connecting means attached to the rear of a towing vehicle. The tongue means of such house trailers and travel trailers usually include some form of screw jack mechanism forming part of the tongue. Normally, they include telescoping tubular members operated by a screw thread that is turned by a crank. The lower end of the movable tubular element is adapted to be moved downwardly by turning the crank until its bottom end contacts a support, which upon continued turning of the crank, raises the front end of the trailer to unhitch it from the towing vehicle.

Various elaborate supporting means have heretofore been produced but they have proved unsatisfactory in many respects. Also, it is quite usual for the owner of a trailer to look around for a rock or stone or any sort of rigid member to place beneath the telescoping tubular members to act as a support. Such improvised supporting means often produce hazardous conditions because they do not bear evenly on the supporting ground, and if the ground level is inclined, it is virtually impossible adequately to support the trailer while it is detached from the towing vehicle.

The principal object of this invention is to provide a simple, inexpensive support that can be stowed in the trailer when not in use.

Another object of the invention is to provide such a support or jack base which will accommodate inclined terrain.

Still another object of the invention is to provide such a support which is light-weight and has a large projected area capable of working in all soil conditions.

Still another object of the invention is to provide such a self-aligning jack base that will accommodate the tubular jack member permanently attached to the tongue of a house trailer.

A further object of the invention is to provide such a jack base in which means is provided to prevent the tubular jack element from falling off the stand, i.e., so that the center of gravity of the house trailer will always lie within the base of the jack support.

A still further object of the invention is to provide such a jack base that is hollow so that forces applied to it will compact the soil and force it into the center thereof, thereby increasing the load-bearing capability of the jack base.

Another object of the invention is to provide such a jack base which is made of metal, thereby to provide a better electrical ground connection to the earth.

In one aspect of the invention, a jack base may comprise a generally conical-shaped metallic casting of hollow construction. It may be suitably ribbed for structural reasons, and its base may provide a substantial annular area adapted to contact the earth.

In still another aspect of the invention, a hemispherical knob may be attached to the top of the conical casting, either by screwing it to the casting or forming it integrally therewith.

In a further aspect of the invention, the hemispherical knob may include a vertically disposed pintle extending above the top surface of the hemispherical knob.

House trailers normally include a tongue adapted to be hitched to a connecting means that is attached to the rear of a towing vehicle. It is common practice to have a vertically disposed tubular member integrally attached to the tongue member of the trailer in which another tubular member is mounted for telescoping motion. A threaded member is usually mounted within the telescoping tubular members, journaled in the top of the tubular member that is connected to the trailer tongue and threaded into a partition within the inner telescoping tubular member. A crank fixed to the top of the threaded member, when turned, causes the inner tubular member to telescope within the one that is fixed to the trailer tongue.

When it is desired to detach the trailer tongue from the towing vehicle, it is only necessary to place the hollow, conical jack support beneath the inner tubular member and crank the same downwardly until the lower edge of the telescoping tubular member receives the pintle and a portion of the hemispherical knob. Continued turning of the crank forces the inner tubular member downwardly, causing the front end of the trailer to be elevated, detaching the tongue from the towing vehicle.

Should the terrain be inclined, even to a point where the trailer begins to tip, there is no possibility of the jack becoming disconnected from the jack base since as the jack becomes angularly disposed relative to the jack base, the pintle engages the inner surface of the inner telescoping member, preventing further angular movement of the jack relative to the base. Furthermore, should the ground on which the jack base is mounted become soft due to rain, or if it is a sandy soil, and the weight of the trailer begins to force it down into the ground, the earth is packed up into the conical member and the farther down the jack base goes, the greater is the resistance to movement downwardly by virtue of the packing of the earth into the hollow interior of the conical jack base.

In a further aspect of the invention, the jack base may include an opening at the top for the reception of a hemispherical portion of a housing adapted to support a pair of bevel gears.

In a still further aspect of the invention, one of the bevel gears may have an internal thread adapted to receive a threaded shaft that is splined to the housing. The construction may be such that rotation of the one bevel gear causes the threaded member to reciprocate vertically. The top of the screw may include a plate adapted to contact a flat portion of the undersurface of the trailer truck. In this embodiment, the jack may be employed at the rear of the house trailer in combination with the previously described jack base to ensure proper leveling of the trailer and retaining it in such condition indefinitely. Preferably, two of the jacks just described are located one at each side of the rear of the house trailer so as to ensure proper leveling of the house trailer by the combination of the three jack arrangements.

The above, as well as other objects and novel features of the improved base and jack will become apparent from the following specification and accompanying drawing which are merely exemplary.

Figure 1:
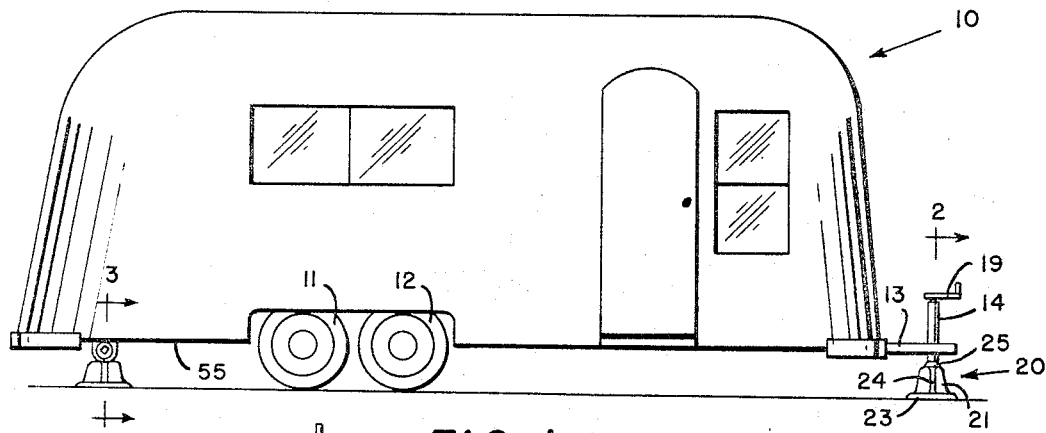
FIG. 1 is a side elevational view of a house trailer supported by jack bases and jacks to which the principles of the present invention have been applied.

Referring to the drawing, the principles of the invention are shown as applied to a jack base and jacks for supporting and detaching a house trailer 10 from a towing vehicle. In the embodiment disclosed, the house trailer is supported by four wheels, only two 11 and 12 being disclosed.

The front end of the house trailer 10 includes a tongue 13 attached to a connector on the rear end of a towing vehicle as is well known in the art. Tongue 13 may have welded to it a vertical tubular member 14 within which an inner tubular member 15 is mounted for telescoping motion. The inner tubular member 15 may include a partition 16 rigidly fixed therein having a threaded opening therethrough for the reception of a threaded rod 17. Rod 17 may extend upwardly through the telescoping members 14 and 15, and its upper end may be journaled within a block 18 rigidly fixed to the top of the outer tubular member 14.

The end of threaded rod 17 may extend through the block 18 and its outer end may be connected to a crank 19. Rotation of crank 19 obviously will cause vertical movement of the inner tubular member 15.

The above described structure is the normal construction of the tongues of house trailers and forms no part of the present invention.

Figure 2:
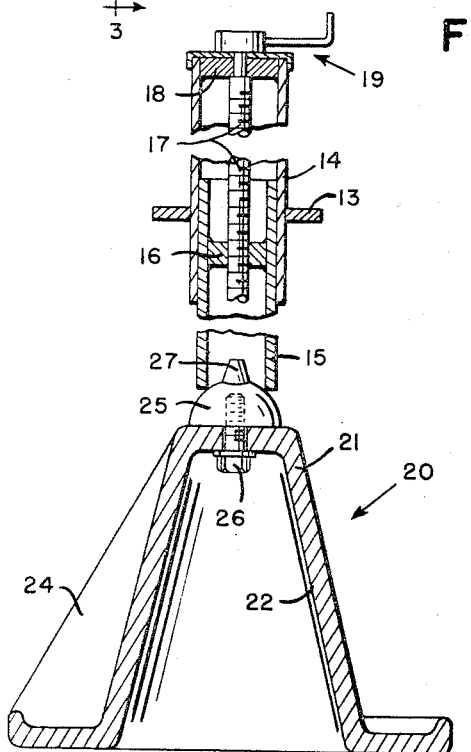
FIG. 2 is a sectional elevational view taken substantially along line 2—2 of FIG. 1.

Referring to FIG. 2, a jack base 20 may comprise a frusto-conical, hollow casting 21 having internal wall surfaces 22 that are parallel with the conical exterior surface of the casting 21. The base of casting 21 may include a relatively wide, annular supporting surface 23, and suitable reinforcing ribs 24 may extend between the supporting surface 23 and the sides of the conical casting 21.

A hemispherical knob 25 may be attached to the top of casting 21, and in the embodiment shown in FIG. 2 it is illustrated as being connected by a cap screw 26 extending through the top of the casting 21 and threaded into the knob 25.

The hemispherical knob 25 may include a pintle 27 adapted to extend upwardly into the telescoping tubular member 15. The construction and arrangement of the parts are such that with the base 20 placed beneath the tubular member 15, the crank 19 is turned so that the bottom edge of tubular member 15 will contact the hemispherical member 25. Then by continual turning of crank 19, the tongue 13 is raised to unhitch it from the connecting member on the towing vehicle. Should the trailer 10, by virtue of uneven and soft terrain, begin to tip, the pinlte 27 engages one of the inner walls of tubular member 15, preventing the jack including the member 14 and 15 from falling off or becoming disconnected from the base 20.

Figure 4:
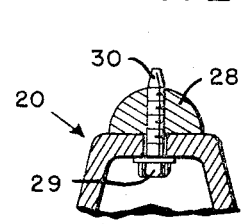
FIGS. 4 and 5 are partial sectional views of modified forms of a detail of the invention.

Referring to FIG. 4, the base 20 supports a hemispherical member 28 having a threaded hole extending completely therethrough. A cap screw 29 may have its end 30 formed as a pintle that extends beyond the periphery of the hemispherical member 28.

Figure 5:
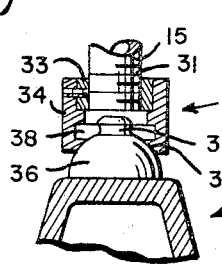

Referring to FIG. 5, the tubular member 15 may be provided with a thread 31 at its lower end to which an adapter 32 is attached. The adapter 32 may comprise a threaded sleeve 33 threaded to the thread 31 on the lower end of tubular member 15. The sleeve 33 may be pressed into a hollow member 34, or otherwise secured therein. Member 34 may include a spherical surface 35 adapted to cooperate with a hemipherical member 36 that may be welded or otherwise integrally attached to the top of base 20. A groove 38 may be provided in the member 34, and a grooved pintle 39 may be an integral part of the hemispherical member 36. In this embodiment, should the trailer 10 tend to tip, the surface 35 slides along the surface of hemispherical member 36 and engages the groove 39 of the pintle.

Figure 3:
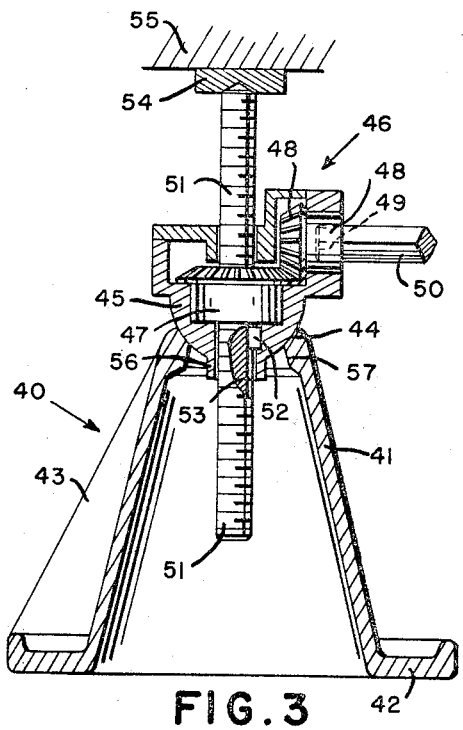
FIG. 3 is a sectional elevational view taken substantially along line 3—3 of FIG. 1.

Referring to FIG. 3, the principles of the invention are shown as applied to a jack base and jack adapted to be used at the rear of the trailer 10. Preferably two of these jacks are used, one on each side thereof.

The embodiment shown in FIG. 3 may include a base 40 of substantially the same form as the base 20 including a frusto-conical, hollow portion 41 having a relatively wide, flanged base 42, with reinforcing ribs 43 similar to reinforcing ribs 24 of FIG. 2.

The upper end of base 40 may include a spherical surface 44 adapted to receive a hemispherical portion 45 of a housing 46. Housing 46 may journal a bevel gear 47 having internal threads therein. Housing 46 may also journal a bevel gear 48 in a manner such that it meshes with the gear 47. Gear 48 may include a socket 49 adapted to receive one end 50 of a crank. The internal threads of the gear 47 may receive a screw 51 that is prevented from rotation by a key 52 that slides within a spline 53 axially disposed along the surface of the screw 51. A plate 54 may be attached to the top of screw 51 for bearing against the undersurface 55 of the trailer 10.

By locating one of the bases 40 with its attending jack mechanism on each side of the rear of trailer 10, and by turning the gears 48 of each, the trailer 10 can be leveled on any type of terrain without danger of tipping.

Referring again to FIG. 3, the hemispherical portion 45 of the housing 46 may include a cylindrical portion 56 adapted to cooperate with a surface 57 of the base 40 adjacent the spherical surface 44 thereof. Accordingly, should the trailer 10 begin to tip with the base 40 and its attendant jack mechanism supporting it, the cylindrical member 56 will engage the surface 57, preventing the trailer from falling off the jack mechanism.

Although the various features of the improved base and jack mechanism for house and travel trailers have been shown and described in detail to fully disclose several embodiments of the invention, it will be evident that changes may be made in such details, and certain features may be used without others without departing from the principles of the invention.

What is claimed is:

1. A jack base for a trailer comprising in combination, a hollow casting having upward inwardly tapered walls; an annular flange about the bottom of said base; a hemispherical member fixedly secured to the top of said casting; and a pintle at the upper extremity of said hemispherical member, reciprocable jack means mounted on said trailer, said jack means having seat means mating with said hemispherical member for relative pivotally movement therebetween, and said pintle preventing the accidental movement of said jack means off said hemispherical member.

2. A jack base for a trailer comprising in combination, a hollow casting having upward inwardly tapered walls; an annular flange about the bottom of said base; and a hemispherical member bolted to the top of said casting, said bolt extending up through the top of said hemispherical member defining a pintle thereon, reciprocable jack means mounted on said trailer, said jack means having seat means mating with said hemispherical member for relative pivotally movement therebetween, and said pintle preventing the accidental movement of said jack means off said hemispherical member.

3. A jack base for a trailer comprising in combination, a hollow casting having upward inwardly tapered walls; an annular flange about the bottom of said base; a hemispherical member integrally attached to the top of said casting and including a grooved protuberance extending upwardly from said hemispherical member, reciprocable jack means mounted on said hemispherical member; an attachment on the lower end of said jack means having a spherical seat adapted to rest on said hemispherical member; and an undercut groove in said attachment adjacent said spherical seat adapted to cooperate with said grooved protuberance upon the angular displacement of said jack means relative to said casting.

4. A jack base for a trailer as in claim 1, wherein said base includes a plurality of substantially elongated reinforcing ribs interconnecting said tapered walls with said base, said hollow casting and said jack means being removable to each other.

References Cited

UNITED STATES PATENTS

| | | | |
|---|---|---|---|
| 1,065,060 | 6/1913 | Leyner | 254—101 X |
| 1,870,087 | 8/1932 | Beckwith | 254—101 X |
| 2,054,568 | 9/1936 | Beach | 254—133 |
| 2,129,806 | 9/1938 | Woodworth | 254—101 |

FOREIGN PATENTS

| | | |
|---|---|---|
| 9,600 | 11/1879 | Germany. |
| 970,221 | 8/1958 | Germany. |

OTHELL M. SIMPSON, *Primary Examiner.*